United States Patent Office.

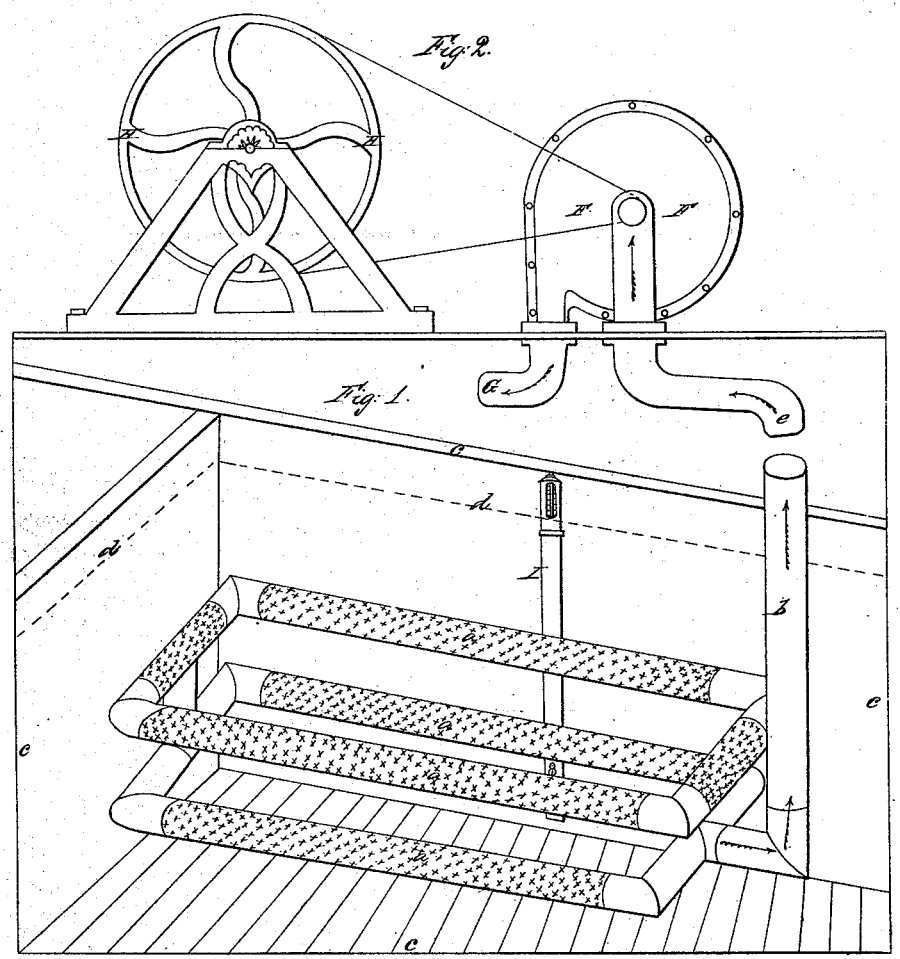

THEODORE A. HOFFMANN, OF BEARDSTOWN, ILLINOIS.

Letters Patent No. 100,628, dated March 8, 1870.

IMPROVEMENT IN ASPIRATORS FOR PREVENTING OVERHEATING OF GRAIN, &c.

The Schedule referred to in these Letters Patent and making part of the same.

*To all whom it may concern:*

Be it known that I, THEODORE A. HOFFMANN, in the city of Beardstown, in the county of Cass, and State of Illinois, have invented a new and useful Improvement in Aspirators, for Preventing Grain or Cereals from Overheating when stored in bins, in warehouses, and elevators, or in vessels when on transport; and I do hereby declare that the following is a full and exact description thereof, reference being had to the accompanying drawing and to the letters of reference thereon.

Figure 1 represents the aspirator in a perspective view.

Letters *a a a a*, the perforated tubes with the non-perforated joints.

*b* the air-tight tube, connected air-tight with the T-joint, and leading from the lower part to the top of the grain, either along the partitions in the bins or the bulkhead in vessels above the deck.

*c c c c* represents the chamber for the grain.

*d*, by linear marks, the height of the grain in bulk.

Figure 2 represents the side view of the exhausting apparatus.

*e* the tube, which is connected air-tight with the tube *b* in fig. 1.

F F represent the inclosure of the fans of the exhauster.

G the opening for blowing out the air drawn from the grain by the tubes *b* in fig. 1 and the tube *e* in fig. 2.

H H the pulley for increasing motion.

I a thermometer. The same is incased about three feet long, with the scale above the grain, like those used in distilleries.

The object of my invention is to provide a convenient and economical apparatus for producing a current of air from the atmosphere outside through the bulk of the grain toward the interior, and thus extracting, by aspiration, the warm and moisty air (the product of spontaneous heating) accumulated there, by means of perforated tubes, adjusted, according to the locality, near the center part of the grain in bulk, with the aid of an exausting apparatus. While moist and warm air is drawn out through the perforated tubes by this operation, and is replaced by a current of fresh air, the grain will be cooled. On the contrary, if a current of air is produced by blowing fresh air into the center of the moist or heated grain, the moisture will be condensed and absorbed more or less from the outer part of the grain.

The aspirator consists in one or more rows of perforated tubes made of sheet or galvanized iron, and is joined together with non-perforated elbows in a square or elliptic form, according to the locality.

The aspirator should be placed in the grain so that the lower row is about two and a half feet from the bottom and the sides of the bulk, and leaving a space of five or six feet between each tube for the grain. The tubes can be placed either horizontal, when in bulks in warehouses or in vessels, or vertically, when the grain is kept in high narrow bins, in such a manner that the double non-perforated T-joint takes the lowest row. From this joint an air-tight tube leads to the surface of the bulk or deck of the vessel, and from thence it is connected either from one, two, or three different chambers or bulks of grain, with the tube fitted air-tight to the exhausting apparatus. The diameter of the tubes can be from two to four inches, according to the quantity of the grain, and so regulated in their joinings that the apparatus can be easily taken apart and replaced where needed.

For an exhauster I use a centrifugal blower, constructed on the principle of Schicles' premium exhauster. The opening of the center of the exhauster is connected air-tight with the tubes from the aspirator projecting outside of the grain. The revolutions of the fans in the exhauster should be from twelve to fifteen hundred per minute.

The proportion of air disengaged by this operation is about as follows:

For two inches diameter in the clear—176 cubic feet per minute, or 10,560 per hour.

Four inches diameter—883 per minute, or 52,980 per hour.

Eight inches diameter—3,531 per minute, or 211,800 cubic feet per hour.

The operations with the aspirator on the grain might be limited to a few hours per day, according to the circumstances, and even discontinued for several days when the atmosphere is damp and sultry. The application of steam for the motive power will facilitate the operation.

I disclaim the application of perforated pipes, cylinders, perforated linings, false bottoms, or movable shafts, for the purpose of blowing artificial heated or cooled air into the grain.

What I claim as my invention, and desire to secure by Letters Patent, is—

The process of disengaging warm and moist air from spontaneously-heated grain, without the aid of artificial heated or cooled air, when in bulk, either in warehouses, bins, or vessels on transport, by means of perforated pipes and exhaust-fan, substantially as herein shown and described and for the purpose set forth.

THEODORE A. HOFFMANN.

Witnesses:
HENRY MENKE,
HENRY E. DUMMER.